UNITED STATES PATENT OFFICE.

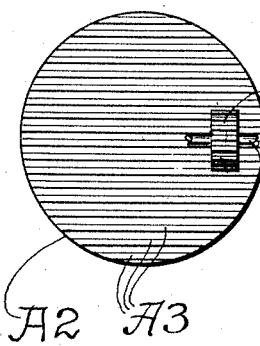
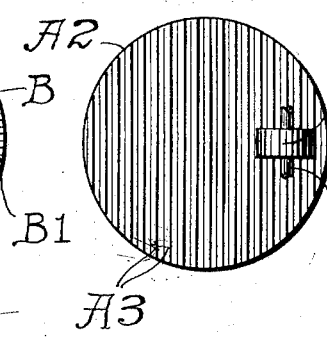
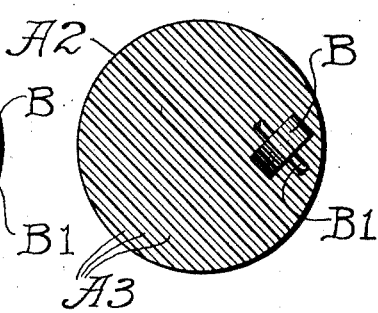
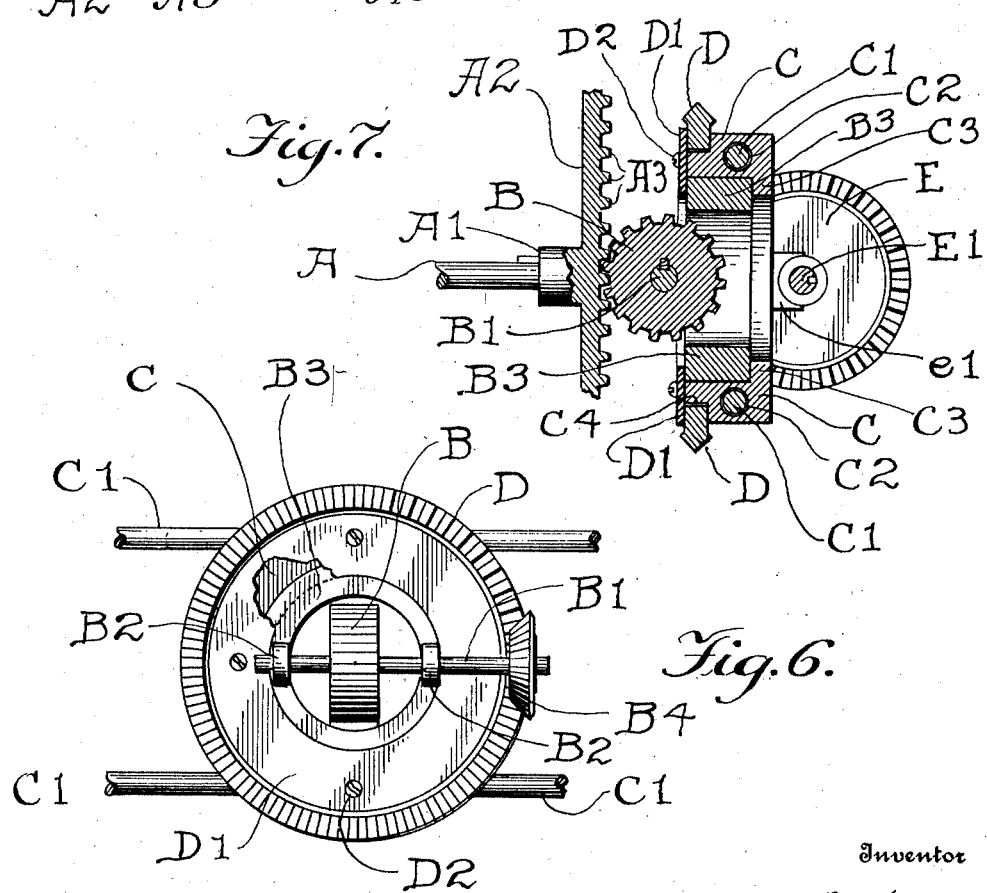

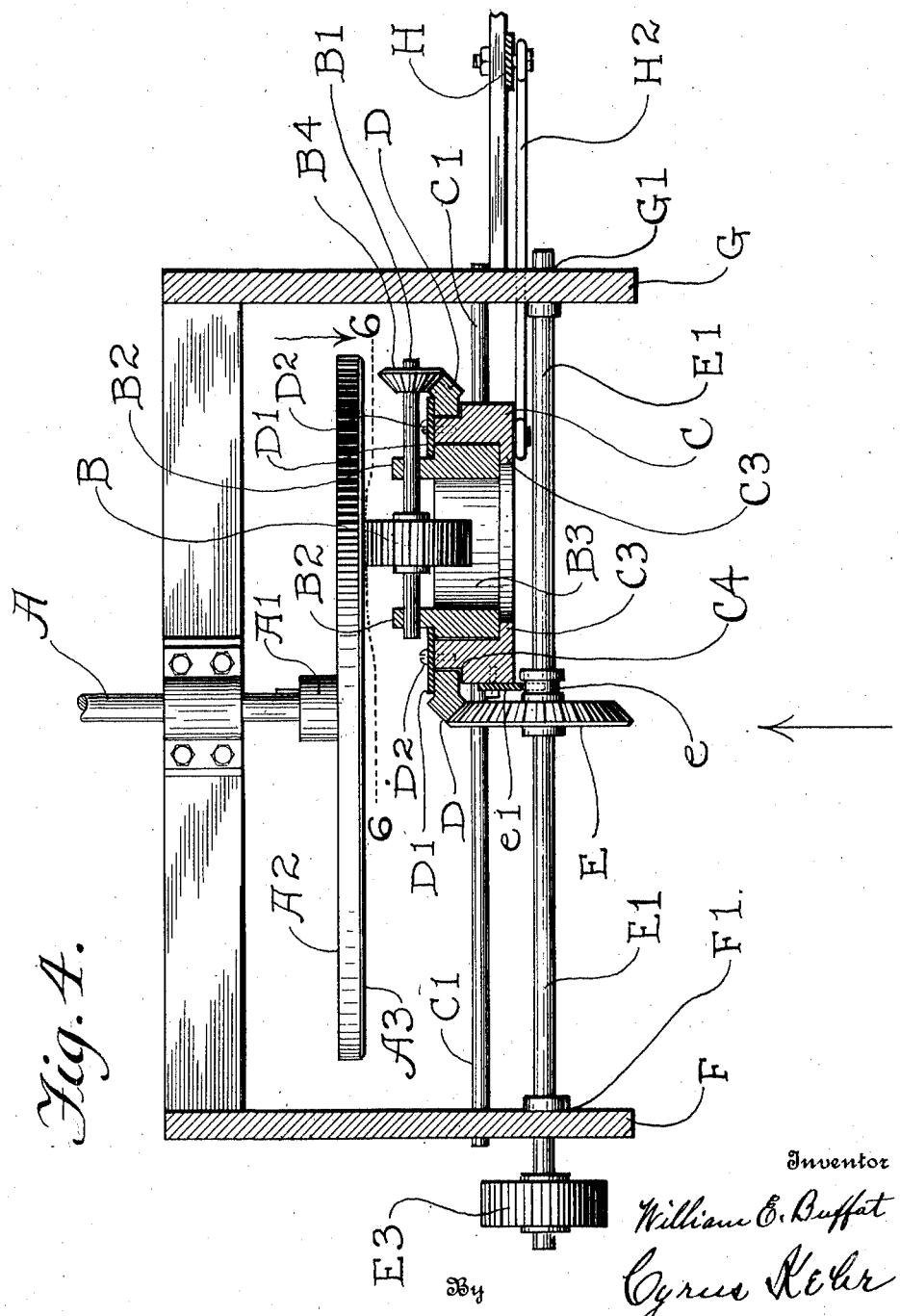

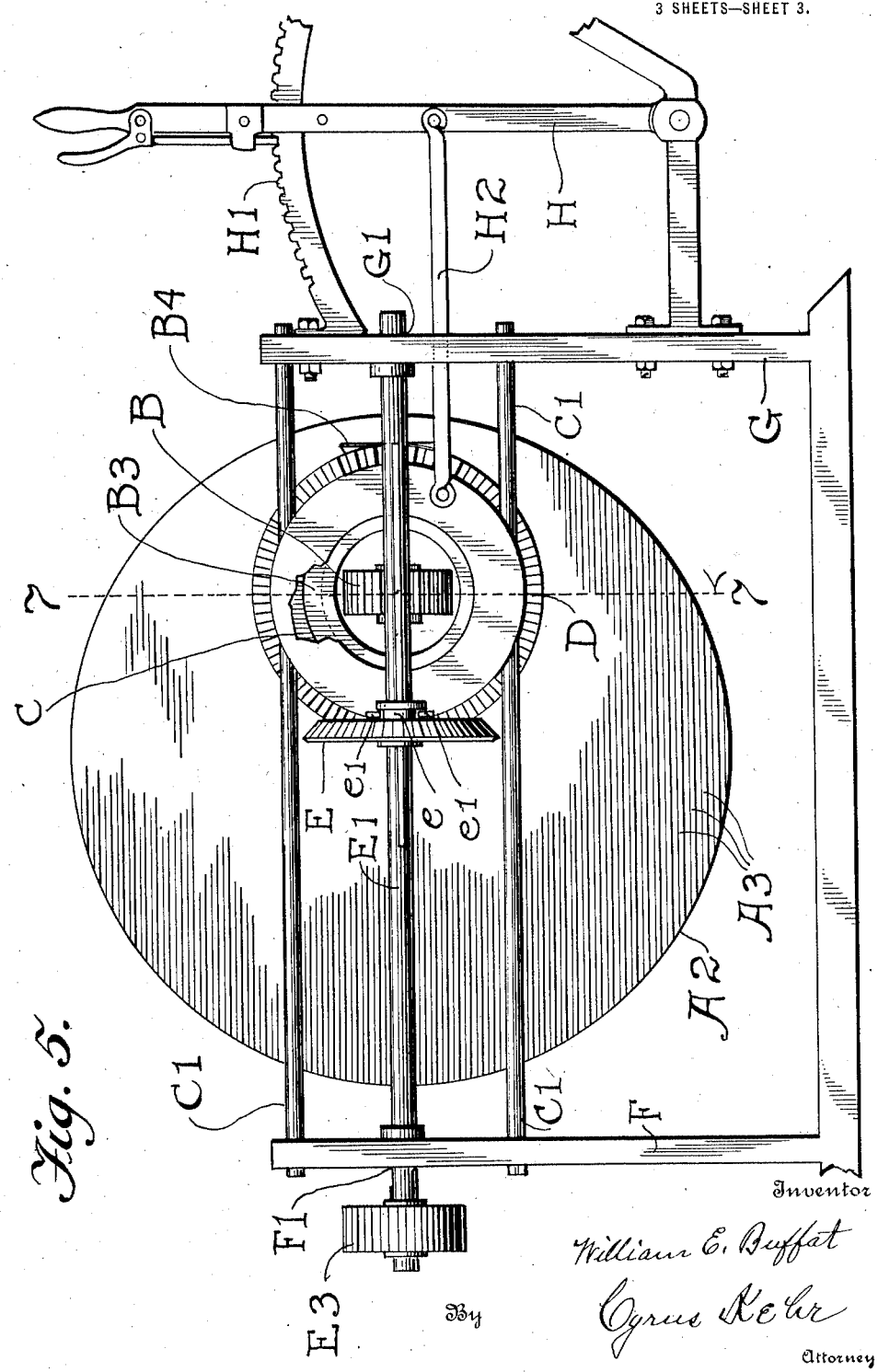

WILLIAM E. BUFFAT, OF NEAR KNOXVILLE, TENNESSEE.

MECHANISM FOR TRANSMITTING MOTION.

1,334,594.      Specification of Letters Patent.      Patented Mar. 23, 1920.

Application filed March 11, 1919. Serial No. 282,013.

*To all whom it may concern:*

Be it known that I, WILLIAM E. BUFFAT, a citizen of the United States, residing near Knoxville, in the county of Knox and State of Tennessee, have invented a new and useful Improvement in Mechanism for Transmitting Motion, of which the following is a specification, reference being had to the accompanying drawing.

My invention relates particularly to a mechanism comprising a rotary drive shaft and a driven shaft and intermediate means for transmitting varying velocity from the constant velocity drive shaft to the driven shaft.

The object of the invention is to produce such a mechanism in which the important transmission members are cog gears remaining in engagement while being relatively shifted for change of velocity.

In the accompanying drawings,

Figures 1, 2 and 3 illustrate inter-engaging cog wheels in different positions;

Fig. 4 is a sectional plan of a mechanism embodying my improvement;

Fig. 5 is an elevation looking toward the machine, in the direction of the arrow below Fig. 4;

Fig. 6 is an upright section on the line 6—6, of Fig. 4, looking in the direction of the arrow;

Fig. 7 is an upright section on the line, 7—7, of Fig. 5, looking toward the left.

Referring to said drawings, motion is to be transmitted from the shaft, A, to the shaft, $E^1$. The rotation of the shaft, $E^1$, is effected in alternate directions at varying speeds.

On the shaft, A, is the disk-form cog wheel, $A^2$, having a hub, $A^1$, keyed to the shaft, A. Cog teeth, $A^3$, extend parallel to each other across the entire face of the wheel, $A^2$.

In Figs. 1, 2 and 3, the disk-form cog wheel, $A^2$, and the spur gear wheel, B, and a part of the shaft, $B^1$, are shown separated from other parts, the wheels, B and $A^2$, being in engagement with each other. As will be described farther on, provision is made in the mechanism for shifting the spur gear wheel, B, horizontally and parallel to the face of the disk-form wheel, $A^2$. Such shifting moves the wheel, B, toward and from the axis of the wheel, $A^2$, which axis is the axial line of the shaft, A. In Fig. 1, the wheel, $A^2$, has been so turned as to bring its cog teeth, $A^3$, into the horizontal position. Hence horizontal shifting of the spur gear wheel, B, is accomplished by sliding the wheel, B, lengthwise on the teeth, $A^3$, of the wheel, $A^2$, such movement requiring no rotation of the wheel, B, on its axis. In Fig. 2, the wheel, $A^2$, has been so turned as to bring its cog teeth, $A^3$, into the upright position. Since the teeth of the wheel, B, are in engagement with the teeth of the wheel, $A^2$, such turning of the wheel, $A^2$, has brought the wheel, B, into the upright position. Now movement of the wheel, B, toward the axis of the wheel, $A^3$, will require a rolling of the wheel, B, on the wheel $A^3$, the inter-engagement of the teeth of the two wheels moving toward the axis of the wheel, $A^2$, while the shifting of the wheel, B, progresses, no endwise sliding of the wheel, B, being necessary. In Fig. 3, the wheel, $A^2$, has been so turned as to bring the cog teeth, $A^3$, of said wheel to an angle of about 45° from the horizontal and vertical, and the wheel, B, has been correspondingly turned, the cog teeth of said wheel still remaining in engagement with the cog teeth of the wheel, $A^2$. Now shifting of the wheel, B, horizontally toward the axis of the wheel, $A^2$, will involve a combination of the features mentioned in connection with the Figs. 1 and 2. The wheel, B, must slide on the cog teeth, $A^3$, and also rotate, these two actions taking place simultaneously.

What has been said in the preceding paragraph relates to the shifting of the wheel, B, across the face of the wheel, $A^2$, to vary velocity imparted to the wheel, B, and its shaft, $B^1$.

Now, assuming that the wheel, B, has been shifted to a desired distance from the axis of the wheel, $A^2$, and the wheel, B, is held at such distance, it will be observed that rotation of the wheel, $A^2$, as shown in Fig. 1, will cause the rotation of the wheel, B, and the rotation of said wheel will cause the rotation of the axle or shaft, $B^1$, on the common axial line of said shaft and the wheel, B. It will also be observed that when the wheel, $A^2$, is being thus rotated, the cog teeth, $A^3$, of said wheel, will through their engagement with the teeth of the wheel, B, turn the wheel, B, on an axis which is parallel to the axis of the wheel, $A^2$, and cuts the wheel, B, on its axial line. In Fig. 2, this turning has proceeded so far as to bring the axial line of the wheel, B, and the shaft, B¹, into the upright position. In Fig. 3 such axial line is in the oblique position assumed by the teeth of the wheel, A².

The mechanism described by the succeeding figures of the drawings comprises means for supporting the shaft, B¹, so as to permit rotation on its own axis and to turn on an axial line which is parallel to the axial line of the wheel, A², as above described, and to transmit motion from the shaft, B¹, to a shaft supported in relatively stationary bearings.

The upright standards, F and G, are located at opposite sides of the wheel, A². Said standards support two horizontal guide bars, C¹, which form a slideway for the support for the spur gear wheel, B. Said bars are parallel to the face of the wheel, A². In the standard, G, is a bearing, G¹, and in the standard, F, is a bearing, F¹. In said bearings rests the shaft, E¹, to permit rotation and to preclude endwise movement. Said shaft projects through the bearing, F¹, and there supports a spur gear wheel, E³, from which motion may be taken to any desired mechanism.

The guide bars, C¹, support a bearing ring, C, whose axis is parallel to the shaft, A. The guide bars, C¹, extend loosely through horizontal apertures, C², formed in the ring, C, whereby the ring, C, may slide on said guide bars while being held against other movement.

The interior of said ring forms a bearing for a rotatable member, B³, which is also in the form of a ring or short tube. At the part of the ring, C, which is the farther from the disk, A², the ring, C, has a flange, C³, which limits endwise movement of the rotatable member, B³, in that direction. On the opposite face of the ring, C, a ring plate, D¹, is seated on the ring, C, and extends over the adjacent end of the rotatable member, B³, and is secured by screws, D².

On the rotatable member, B³, diametrically opposite each other are two bearings, B², in which rests a shaft, B¹, which is held to permit rotation and to prevent endwise movement of the shaft in said bearings. On said shaft between said bearings is a spur gear wheel, B, which is keyed to said shaft for rotation in unison with the latter. Said wheel is at all times in mesh with the teeth, A³, on the wheel, A², and receives rotation from said wheel.

On the periphery of the ring, C, is a channel, C⁴, in which rests a bevel gear ring, D. The ring plate, D¹, extends outward of a part of said gear ring to hold the latter in the channel, C⁴. Said ring, D, has bevel teeth facing in two directions, first to engage a bevel gear wheel, B⁴, fixed on the shaft, B¹, and, second, to engage a bevel gear wheel, E, slidable on the feathered shaft, E¹.

The bevel gear wheel, E, is to be suitably engaged to the ring, C, to cause the bevel wheel to slide on the shaft, E¹, in unison with the movement of the ring, C, when the latter is shifted on the guide bars, C¹. For this purpose the drawings show the hub of the wheel, E, provided with a circumferential groove, e, and a bracket, e¹, fixed on the ring, C, and extending into said groove. This permits said wheel to rotate while the bracket engages said hub to compel movement parallel to the guide bars when the bracket and the ring, C, are shifted on the guide bars parallel to the latter.

The ring, C, is to be held stationary on the guide bars, C¹, in various positions at either side of the axial line of the shaft, A, or to be in alinement with said axial line. For shifting said ring, a quadrant lever, H, is mounted in relation with a quadrant, H¹, and a link, H², is coupled by one end to the quadrant lever and by its other end to said ring. The quadrant lever may be put into any desired position and there allowed to remain, whereby the ring, C, is held stationary.

The operation is as follows:

If the ring, C, is placed directly on the axial line of the shaft, A, the spur gear wheel, B, will not receive direct rotation (rotation on its own axis) but will be turned on the axial line of the shaft, A, whereby the ring, B³, is rotated in unison with the shaft, A, and the bevel gear wheel, B⁴, is carried in an orbital path around the common axial line of the shaft, A, and the ring, B³. Since said bevel gear wheel, B⁴, is in engagement with the bevel gear ring, D, the latter is moved around said common axial line in unison with the disk, A². Such rotation of the bevel gear ring will cause the rotation of the bevel gear wheel, E, and the shaft, E¹, continuously in the same direction and at uniform velocity. The velocity imparted to this shaft will depend upon the relative sizes of the several gear wheels.

Assuming that the ring, C, is out of alinement with the shaft, A, and said shaft is being rotated; then the wheel, B, will receive rotation on its own axis (this shaft, B¹) and at the same time said wheel, B, will be turned on the axial line of the rotatable member, B³, this being accomplished by the change of direction of the teeth on the disk wheel, A². In other words, the wheel, B, will relatively traverse an orbital path around the axial line of the shaft, A, and, while so doing, will have its teeth kept parallel and in engagement with the teeth, A³, of wheel, A². The axial rotation of the spur gear wheel, B, causes the rotation of the shaft, B¹, and the bevel gear wheel, B⁴. The rotation of that bevel gear wheel causes the rotation of the bevel gear ring, D, and the latter causes the rotation of the bevel gear wheel, E, on the shaft, E¹.

The direction of rotation of the wheel, B, and the shaft, B¹, changes when said wheel crosses the two radii of the disk wheel, A², which are perpendicular to the teeth of the disk wheel. Said radii are in alinement with each other and cut said disk wheel into two equal parts. Thus the direction of rotation of the wheel, B, and the shaft, B¹, changes during each rotation of the shaft, A, and the disk wheel, A², and this causes reversal of the shaft, E¹, twice during each rotation of the wheel, A².

Furthermore, it is to be noted that during each such alternate rotation of the shaft, E¹, the velocity varies, the lowest velocity occurring during a change of direction and increasing to a point midway between said change and the next change of direction.

If so desired, this variation in velocity may be equalized by suitable gearing applied to said shaft; and, if desired, the alternating rotation of said shaft may be converted into a continuous rotation in the same direction.

To vary the speed of this transmission when the wheel, B, is out of the axial line of the shaft, A, the supporting ring, C, is to be shifted farther from or nearer to said axial line. During such adjustment the teeth of the spur gear wheel, B, do not lose engagement with the teeth of the disk wheel, A². On the contrary, the teeth of the wheel, B, slide endwise along the teeth on the disk wheel, A², or roll transversely on said teeth, or traverse said teeth diagonally by rolling and sliding.

It is to be observed that the gear teeth arranged parallel to each other and extending entirely across the face of the disk wheel serve as a means of maintaining engagement with the spur gear wheel, B, during all the movements of the supporting ring, C, on the guide bars, C¹. In order that such engagement may be maintained, the spur gear wheel, B, and its shaft, B¹, are mounted on the rotatable ring, B³, whereby the wheel, B, may keep itself parallel to the teeth on the disk, A².

I claim as my invention,

1. In a mechanism for transmitting motion, a disk-form cog wheel having cog teeth extending parallel to each other across one of the faces of said wheel, a spur gear wheel having cog teeth in maintained engagement with the cog teeth of said disk-form wheel, a support for said spur gear wheel, said support being shiftable parallel to said disk-form wheel and toward and from the axial line of said wheel, and said support being also rotatable on an axis which is parallel to the axis of said disk-form wheel, a driven shaft, and members establishing operative relation between said spur gear wheel and said driven shaft for transmitting motion from said spur gear wheel to said driven shaft, substantially as described.

2. In a mechanism for transmitting motion, a disk-form cog-wheel having cog teeth extending parallel to each other across one of the faces of said wheel, a spur gear wheel having cog teeth in maintained engagement with the cog teeth of said disk-form wheel, means forming a slide-way parallel to said disk-form cog wheel, a support for said spur gear wheel, said support being slidable on said slideway toward and from the axial line of said wheel, and said support being also rotatable on an axis which is parallel to the axis of said disk-form wheel, a driven shaft, and members establishing operative relation between said spur gear wheel and said driven shaft for transmitting motion from said spur gear wheel to said driven shaft, substantially as described.

3. In a mechanism for transmitting motion, a disk-form cog wheel having cog teeth extending parallel to each other across one of the faces of said wheel, a spur gear wheel having cog teeth in maintained engagement with the cog teeth of said disk-form wheel, a shaft on which said spur gear wheel is fixed, a support for said spur gear wheel, means forming a slide-way parallel to said disk-form cog wheel, a member slidable on said slide-way, a member rotatable on said slidable member and having bearings in which said shaft rests rotatably, a driven shaft, and members establishing operative relation between said spur gear wheel shaft and said driven shaft for transmitting motion from said spur gear wheel shaft to said driven shaft, substantially as described.

In testimony whereof I have signed my name this 5th day of March, in the year one thousand nine hundred and nineteen.

WILLIAM E. BUFFAT.